United States Patent [19]

Showalter et al.

[11] 3,925,022

[45] Dec. 9, 1975

[54] DETECTING APPARATUS

[75] Inventors: Lane Crawford Showalter; John Leslie Brokenshire, both of Waterloo; Geoffrey Brian Watts, Kitchener, all of Canada

[73] Assignee: Marsland Engineering Limited, Waterloo, Canada

[22] Filed: Sept. 26, 1974

[21] Appl. No.: 509,623

[30] Foreign Application Priority Data

Oct. 1, 1973  Canada .............................. 182296

[52] U.S. Cl. ................................ 23/254 E; 73/23.1
[51] Int. Cl.² ................. G01N 31/06; G01N 31/08
[58] Field of Search .......... 23/254 E, 232 C, 254 R, 23/255 E; 73/23, 23.1

[56] References Cited
UNITED STATES PATENTS

| | | | |
|---|---|---|---|
| 3,053,077 | 9/1962 | Tracht ................................ 73/23.1 |
| 3,305,000 | 2/1967 | Bullen et al. ................ 23/232 C UX |
| 3,622,276 | 11/1971 | Haahti et al. .................. 23/232 C X |
| 3,640,624 | 2/1972 | Anderson et al. ................... 73/23 X |

*Primary Examiner*—Robert M. Reese
*Attorney, Agent, or Firm*—Wheeler, Morsell, House & Fuller

[57] ABSTRACT

The apparatus comprises a collector assembly having a passage filled with a solid adsorbant which is capable of adsorbing the specific vapour together with other vapours in the atmospheric sample and which is also capable of being readily heated to desorb the adsorbed vapours. The outlet of the passage of the collector assembly is connectable to a partition column, which separates the desorbed vapours. The partition column is connected to a detector, which detects the specific vapour among the vapours separated by the partition column. The collector assembly is movable between a sampling position where the passage is communicated with the atmosphere and unconnected to the partition column, and an analyzing position where the passage is connected to the partition column and unconnected to the atmosphere. The apparatus also includes means to draw the atmospheric sample over the adsorbant when the collector assembly is in the sampling position, heating means for heating the adsorbant when the collector assembly is moved to the analyzing position and a carrier gas source connectable to the inlet of the collector assembly to provide a flow of a carrier gas so that the carrier gas carries the vapours desorbed from the adsorbant to the partition column for separation and the separated vapours to the detector for detection of the specific vapour. The apparatus is useful for detection of hazardous or toxic materials or substances being used for illegal purposes, such as explosives and narcotics, which emit their vapours.

25 Claims, 6 Drawing Figures

DETECTING APPARATUS

FIELD OF THE INVENTION

This invention relates to an apparatus for detecting a trace of a specific vapour in an atmospheric sample.

BACKGROUND OF THE INVENTION

The present trends in the use of hazardous or toxic materials or objects for illegal purposes has generated the need for apparatus capable of rapidly detecting the presence or absence of these materials or objects by means of analyzing atmospheric samples for trace concentrations of their vapours. Most of the materials or objects being ued for illegal purposes contain or slowly form substances which have finite vapour pressures at ambient temperatures, and therefore these materials will emit vapours of these substances into the surrounding atmosphere. The concentration of these vapours in the vicinity of the emitting material will be dependent upon the vapour pressure of the substance, the degree of exposure of the material, and the nature of localized atmospheric disturbances. Provided the concentration of a specific vapour in a given atmospheric sample is above an experimentally determined level, designated the threshold sensitivity, the presence of that vapour will be positively confirmed by the apparatus. The lack of such a confirmation indicates either that the specific vapour is absent or present in a concentration below the threshold sensitivity. Since a specific vapour in an atmospheric sample is usually associated with various other vapours, the apparatus is required to have an ability to select the specific vapour for detection out of the other vapours. It is also desired that the apparatus be portable for easy transportation. None of the instruments at present in use fulfils the ideal requirements in terms of sensitivity, selectivity for a specific vapour or practical size or cost to manufacture.

SUMMARY OF THE INVENTION

The present invention provides an apparatus for the rapid detection of a specific vapour in an atmospheric sample, which is relatively inexpensive to manufacture while having high sensitivity and selectivity for the specific vapour and which can be made portable. The apparatus of the invention comprises a collector assembly having an inlet and an outlet and a passage extending from the inlet to the outlet. The passage is filled with a solid adsorbant which is capable of adsorbing the specific vapour together with other vapours in the atmospheric sample and which is, at the same time capable of being readily heated to desorb the adsorbed vapours. Heating means are provided to heat the adsorbant thereby desorbing the adsorbed vapours. A partition column is connectable to the outlet of the passage of the collector assembly for separating the desorbed vapours. The partition column is then connected to a detector which is designed to detect the specific vapour among the separated vapours. A carrier gas source is connectable to the inlet of the passage of the collector assembly to provide a flow of a carrier gas so that the carrier gas passes the desorbed vapours to the partition column for separation and the separated vapours to the detector for detection of the specific vapour. The collector assembly is movable between a sampling position and an analyzing position. In the sampling position, the passage of the assembly is communicated with the atmosphere while disconnected to the partition column and the carrier gas source. In the analyzing position, the passage of the assembly is connected to the partition column and the carrier gas source for flow of the carrier gas therethrough while disconnected to the atmosphere. Means are provided which draw the atmospheric sample over the adsorbant when the collector assembly is in the sampling position so that vapours in the sample are adsorbed on the adsorbant.

The collector assembly collects trace vapours from an atmospheric sample by utilizing the phenomenon of adsorption of gasses on solid surfaces. The process of adsorption is an equilibrium effect, which results in an increased concentration of a molecular or atomic species at the solid surface than in the vapour phase above the solid. By selecting a suitable solid adsorbant wherein the equilibrium lies in favour of adsorption, it is possible to remove a significant amount of the selected vapour from the gaseous sample passing over the adsorbant. The amount of specific vapour removed from the sample by adsorption can be greatly increased by cooling the adsorbant to a temperature below that of the sample. It is therefore preferred to provide means for cooling the adsorbant, e.g. a thermoelectric module which utilizes the Seebeck and Peltier effect. The present invention utilizes the equilibrium nature of these adsorption processes to remove the adsorbed species by rapidly heating the adsorbant. For the purposes of the present invention, the adsorbant is selected for, (a) its ability to adsorb a specific vapour though not exclusively, (b) its capability of being rapidly heated and cooled and (C) its relative inertness, in order to maintain its activity over a long time period. For example, gold and nickel wires may be used as adsorbants for a wide variety of vapours.

The performance of this collector assembly is dependant upon the optimization of several physical parameters. The solid adsorbant should provide a large surface area to volume ratio, offering a significant adsorptive surface, while allowing rapid heating and cooling due to the small mass of solid adsorbant. The adsorbant should be designed to occupy the smallest volume practicable in order to obtain the greatest concentrating effect, while enabling practical gas flows to be attained through the collection device for sampling purposes. The design and construction of the collector assembly is paramount in determining the threshold sensitivity of the apparatus.

Preferably, the collector assembly has an additional passage which is arranged to communicate with the carrier gas source and the partition column when the assembly is in the sampling position and to be disconnected from them when the assembly is in the analyzing position. The additional passage is a straight-through pathway for free flow of the carrier gas. During the sampling procedure i.e. when the collector assembly is in the sampling position, the carrier gas flows through the additional passage and through the partition column and the detector. When the assembly is moved from the sampling position to the analyzing position, the additional passage is displaced while the passage filled with the adsorbant takes its place for communication with the partition column.

The partition column provides a means whereby the trace vapours desorbed from the collector may be separated from each other before passing through the detector. The construction of the column is designed to optimize the time for a selected vapour to traverse the length of the column in relation to its separation from all other vapours which will produce responses in the detector. In general the longer the traverse time the greater the separation which means that in order to achieve a rapid analysis time a compromise has to be made in terms of separation. The column consists of a long tube of small diameter made of inert material, which is preferably flexible, an ideal material is Teflon (a trade mark for polytetrafluorethylene). The column is then filled with a solid material which is held in place by small plugs of glass wool at each end. This solid material may be either an "active" solid or an inert solid which has been activated by coating with a small amount of liquid. The nature of the active solid or coated solid is preselected to give the optimum performance in relation to the selected vapour to be detected. A preferred embodiment utilizes columns which have traverse times in the region of 20 seconds, which offers a good compromise between speed of operation and degree of separation. The separating effect of the column is derived from the preferential adsorption of vapours by the active solid packing. Vapours which are not adsorbed pass through the column very rapidly, while those which are strongly adsorbed pass through the column very slowly, and are also spread out over a long time period. The performance of the column is strongly influenced by the rate at which carrier gas flows through it and its temperature. Both of these parameters are preselected in the present apparatus for the detection of a selected vapour.

The vapours eluting from the partition column pass directly through the detector. A preferred detector for the purpose of the present invention comprises a chamber having an inlet and an outlet for flow of the separated vapours therethrough, means to provide free electrons in the chamber, and a cathode and an anode in the chamber. The electrodes are connected to means to apply a DC voltage to the electrodes and to monitor the current flowing between the electrodes. When a DC voltage is applied to the electrodes, secondary electrons, formed by interaction of B-particles with the carrier gas, move towards the anode. Under equilibrium conditions in the presence of carrier gas only, a constant number of electrons reach the anode in unit time and these may be monitored in the form of a "standing current" in the detector. When a molecular species capable of capturing an electron enters the detector, the number of electrons reaching the anode is further decreased, and a resulting decrease in the detector current is observed. The applied DC voltage may be either continuous or in pulses, and in a preferred embodiment the pulse rate is optimized to give maximum detector sensitivity to a selected vapour. The temperature also affects the performance of the detector, particularly in the adsorption of vapours within the detector. It is preferred to provide a means of maintaining the partition column and the detector at a contant preset temperature.

The sampling of an atmospheric sample may conveniently be carried out by means of a pump which is arranged to draw the sample through the passage filled with the adsorbant. It is preferred to provide a control circuit for automatically shutting off the pump when the collector assembly is moved from the sampling position to the analyzing position.

The carrier gas is essential to the operation of the apparatus and is usually a high purity inert gas such as helium or argon or a high purity inert gas containing a low concentration of a purge gas such as 5% methane in argon. The composition of the carrier gas is a factor in the optimization of the threshold sensitivity of the apparatus to a selected vapour.

The change in current flow with respect to time at the signal output of the detector is sometimes difficult to interpret due to the presence of an interfering substance. The system was originally set up so that a predetermined current flow was established in a base current meter. In the presence of the detected material, the base current of the detector exceeded the predetermined threshold level. A "zero" control was used to adjust the base current indication to a range near to zero on the indicating meter. When a sample was taken, if the material to be detected was present, the base current would rise above the threshold level at the characteristic time for that material. This signal increase above the threshold was detected and used to trigger alarm circuitry. Unfortunately, this method is susceptible to false triggering by interfering substances which delayed the return of the base current to its normal value after taking a sample, and up until the characteristic time for the material to be detected. This necessitated setting the threshold level higher than would otherwise be required, thereby sacrificing sensitivity. In addition, the normal base current drift necessitated regular adjustment of the control.

Ideally, it is desirable to obtain a specific peak current at a specific time as an indication of a particular substance. However, in many instances the detector simultaneously processes interfering substances. The current change which results at the output is a combination of the detection of a specific substance in conjunction with one or more interfering substances and the positive response peak of the desired substance is difficult to resolve. To overcome these problems the signal is differentiated with respect to time. The resulting signal has the property that when a peak in the base current occurs, the first derivative produces an S-shaped zero crossing. In addition, the long term zero drift is greatly attenuated at the differentiator output.

In the presence of interfering materials which cause peaks in the base current before the characteristic time of the material to be detected, the wanted peak is superimposed on a relatively rapidly increasing base current, due to the fact that materials with shorter retention times than the material to be detected are still eluting from the column. Under these conditions the signal is of the same shape but is displaced from zero. This last possibility is contended with by differentiating the signal a second time. This second derivative produces a distinct zero crossing point at the time of a peak of the detector output. In addition, this point crosses zero even when the detector peak is superimposed on a substantial slope due to an interfering substance.

In accordance with the present invention there is also provided a signal processing circuit connected to the output of the detector which takes the second derivative of the output signal. The second derivative of the output signal has the characteristic that a peak signal appearing at the output of the detector is transformed into a zero crossing point even in the event that the desired detected peak is superimposed on a substantial slope due to an interfering substance.

BRIEF DESCRIPTION OF THE DRAWINGS

In order to make the apparatus semi-automatic, measuring and control circuitry may be incorporated which will be described with reference to a preferred embodiment illustrated in the accompanying drawings.

In the drawings.

Figure 1:
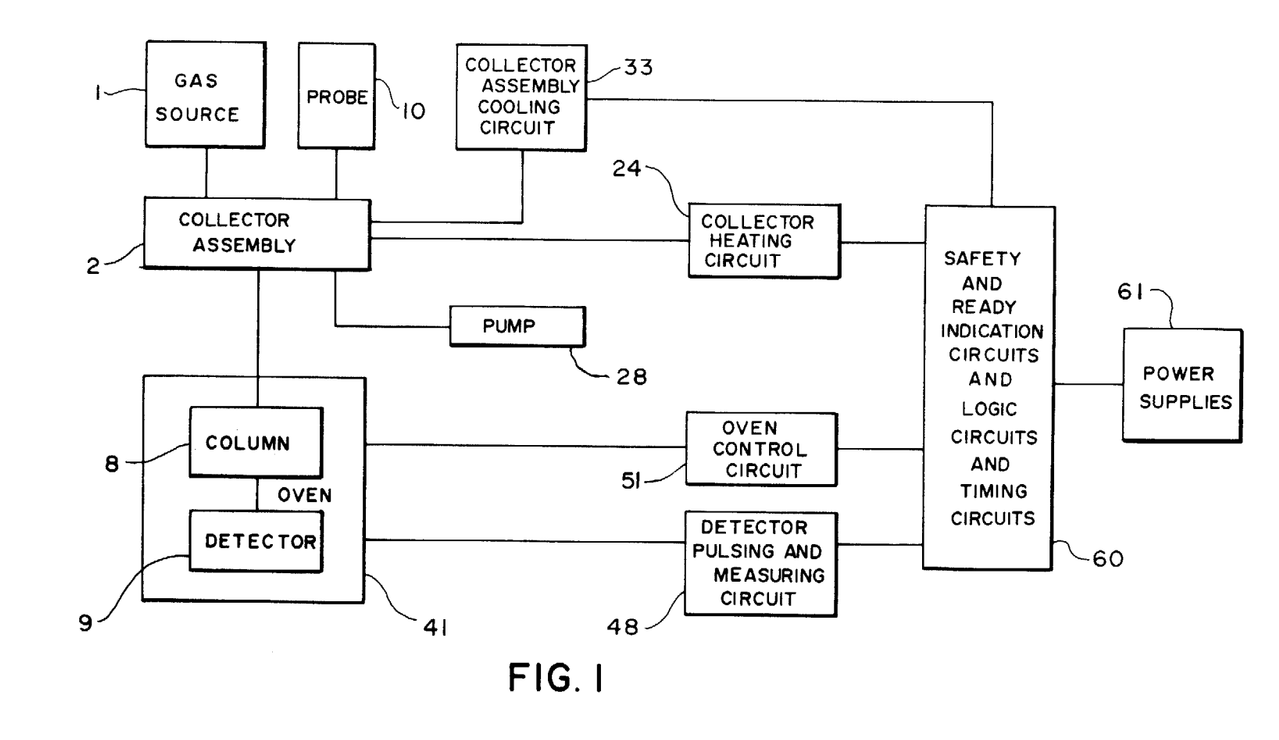
FIG. 1 shows a block diagram of the major components of the apparatus.
Figure 2:
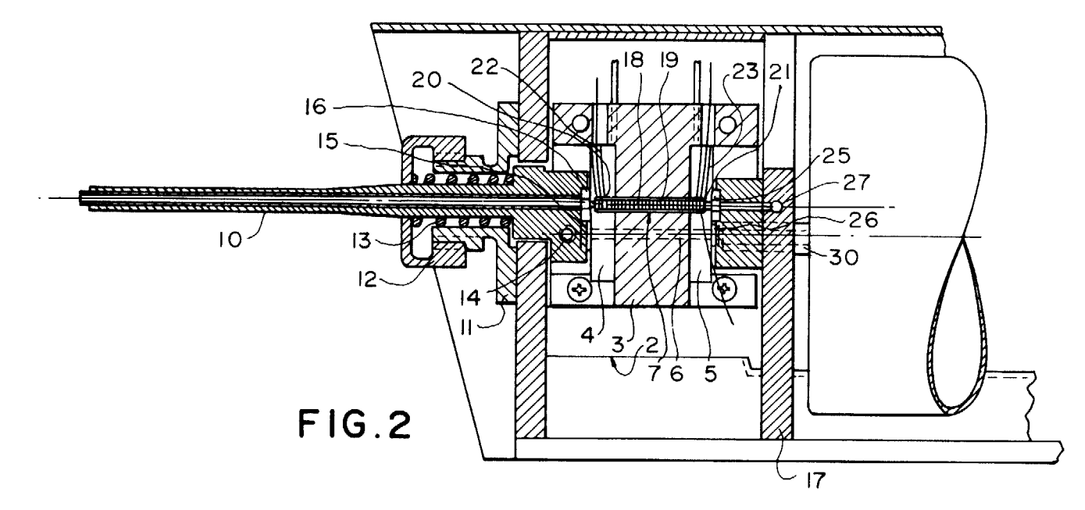
FIG. 2 shows a cross-section through a typical collector assembly.
Figure 3:
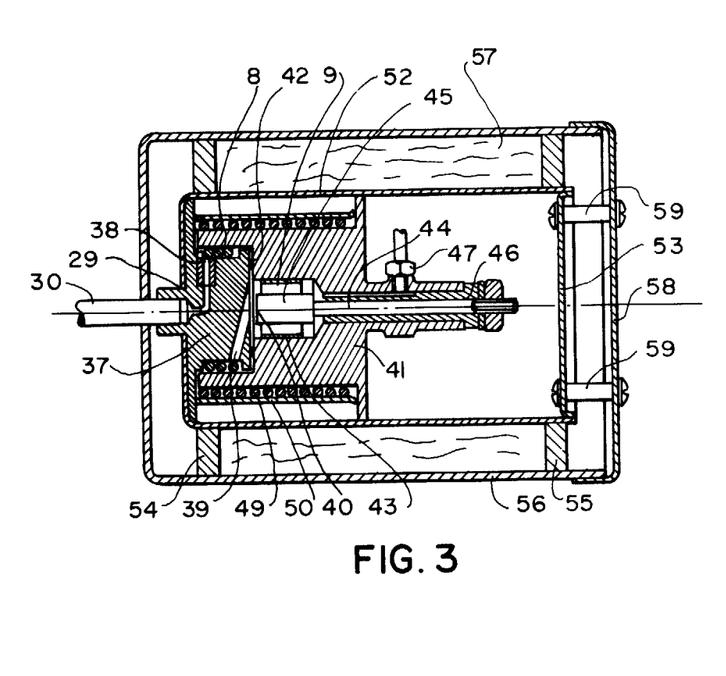
FIG. 3 shows a cross-section through a column, detector and oven assembly.

Referring to FIGS. 1, 2 and 3, a source of high purity carrier gas 1, helium, argon or 5% methane in argon, is provided by a gas cylinder via a two stage regulator and fine metering valve to an appropriate inlet at the collector assembly 2. The gas passes through sliding collector blocks 3, 4, 5 by one of two paths namely via a passage 7 filled with a solid adsorbant (collector) 18 or via a straight-through passage (reference passage) 6, and thence to a partition column 8 and a detector 9.

In FIG. 2 the collector assembly 2 is in the sampling position. The probe 10 consists of a stainless steel tube which is lined on the inside with fine teflon tubing and fastened to the front plate assembly 11 by means of a knurled nut 12 and compression spring 13. The probe 10 is fitted with a carrier gas inlet 14, and a gas tight seal to the collector sliding block 3, 4, 5 by means of a recessed O-ring 15. A similar O-ring 16 provides a gas tight seal between the probe inlet and the collector sliding block. The sliding block is enclosed between the front plate assembly 11 and the back plate assembly 17, and tension is provided by the compression spring 13.

The sliding block assembly contains a reference passage 6 and the collecctor 18, illustrated as a wire coil. The sliding block 3, is constructed of teflon, and a fine hole 6 is drilled straight through the block to form the reference side. A larger hole is drilled through the block and the wire coil 18 inserted in teflon tubing 19 is mounted in this hole with the ends protruding. The two ends are then push-fit to give gas tight seals at 20, 21 into teflon end blocks 4, 5. The two ends of the wire coil pass through holes 22, 23 drilled in the end blocks 4, 5 which are then sealed by passing the wire through teflon plugs which are push-fit into the holes 22, 23. The ends of the coil 18, are fastened to electrical contacts from the collector heating circuit 24. Gas tight seals are accomplished between the teflon end block 5 and the back plate assembly 17 by means of recessed O-rings 25, 26. A right angled passage 27 is drilled through the back-plate assembly and connected to the suction pump 28. A straight passage through the back plate assembly connects the collector assembly to the column, line 29 by means of a short piece of heavy wall teflon tubing 30 which forms a gas-tight seal between the two. The separation between the reference and collector passages is such that in the sample position, the collector is lined up with the probe 10 and pump line 27, and the reference passage is lined up with the carrier gas inlet 14 and the column line 29.

The thermoelectric module 31 is sandwiched between the collector block 3 and a heat exchanger 32, with the cold side adjacent to the block 3. A thermal insulating gasket, e.g. asbestos, prevents contact of the cooled block 3 with the heat exchanger 32. The thermoelectric module is connected to the collector assembly cooling circuit 33. A small blower provides cooling for the heat exchanger 32.

Figure 4:
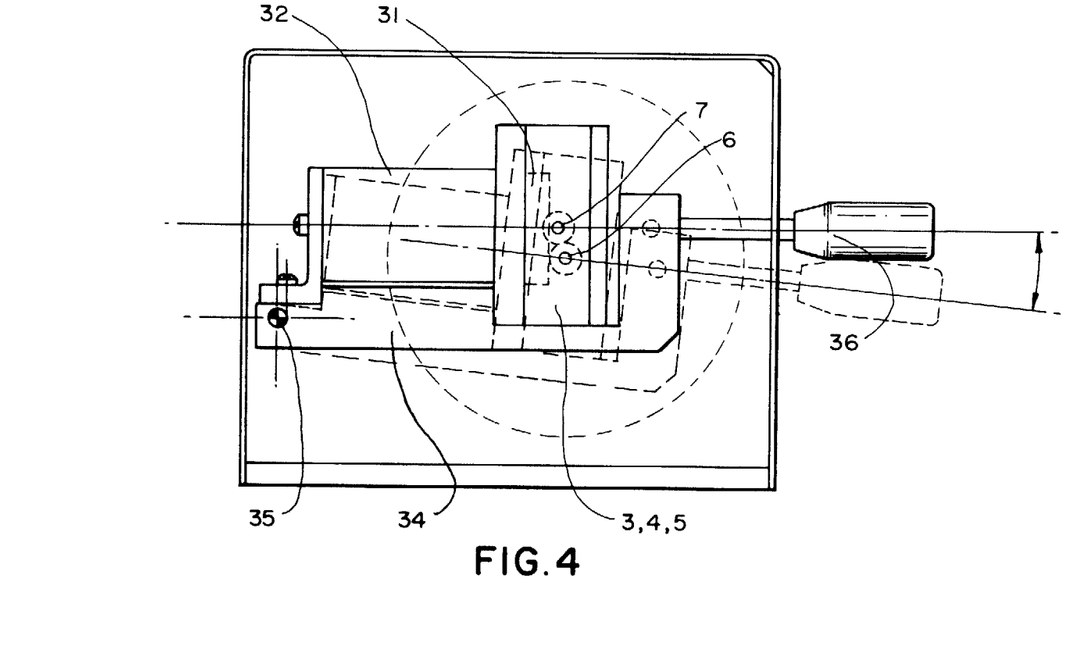
FIG. 4 illustrates the operation of the collector assembly.

FIG. 4 shows the operating principle of the collector. The complete assembly 3, 4, 5 together with the thermoelectric module 31 and heat exchanger 32 is fastened to a metal tray 34 which is pivoted at 35. A lever 36 is attached to the tray and allows the collector to be transferred from the sampling to analyzing position and vice versa. The collector assembly is illustrated in the sampling position with the collector lined up with the probe 10 and the pump line 27, while the reference side is lined up with the carrier gas inlet 14 and the column line 29. Downward movement of the lever 36 brings the collector in line with column line 29. The collector assembly is then in the analyzing position (dotted).

FIG. 3 shows the column, detector and oven assembly. The column 8 is wound around the cylindrical portion of the column assembly 37, and the ends push-fit into holes drilled through this assembly at 38, 39 to give gas-tight seals. The hole at 38 is drilled to meet the column line 29 at right angles. The hole at 39 is drilled at an angle to enter the detector 9 at 40 the column assembly 37 is bolted to the oven detector housing 41 and separated by a teflon gasket 42.

The detector comprises the chamber 9 having an inlet 40 and an outlet, and a radioactive foil 43 as means to provide free electrons in the chamber. In this embodiment, the foil 43 serves also as a cathode. Into the chamber 9 is extended a rod 44 of metal e.g. stainless steel having its inner end 45 serving as an anode. The oven detector housing 41 consists of a cylindrical body of metal such as aluminum in one end of which a wide cylindrical hoe is drilled to form the chamber 9. In the chamber 9 the radioactive foil 43 is placed to cover the cylindrical side wall of the chamber. The foil 43 is usually made of platinum or stainless steel, one side of which has been coated with a radioactive material such as titanium tritide or Ni63, typical activities of which may be 200 mc and 15 mc respectively. The size of the foil used determines the size of the cylindrical hole to be drilled in the metal body. In this embodiment a 1½ × ½ inch stainless steel foil with 200 mc of titanium tritide is fitted in cylindrical form with its uncoated inactive side adjacent to the side wall of the chamber 9. From the opposite side of the metal body a small diameter hole is drilled and into this hole is inserted a cylindrical plug 46 of an inert insulating material, for example, teflon which has a central hole drilled throughout its length and a flattened portion along part of its length. The central hole provides the means of holding the metal rod 44 so that the inner end 45, i.e. anode, extends in a concentric relation with the cylindrical foil, i.e. cathode. The flattened portion allows the carrier gas to pass to exhaust by means of some form of shut-off valve. The shut-off valve allows the whole system to be sealed under a positive carrier gas pressure thus preventing back diffusion of air to the detector. The cylindrical rod 44 is inserted through the foil side of the plug 46 such that the inner end 45 of the rod is exposed to the foil 43, while the other end is exposed to the air enabling electrical connections to be made. The radius of the inner end 45 of the rod which is concentric with the foil 43 has a large effect on the sensitivity of the detector to a specific vapour to be detected, and the optimum radius is therefore predetermined. The detector design described above enables a variety of different sized electrodes to be interchanged quite simply.

The electrodes 43 and 45 are connected to a detector pulsing and measuring circuit 48 which applies a DC voltage to the electrodes and monitors the current flowing between the electrodes.

The foil 43 coated with 200 mc of titanium tritide emits $\beta$ particles with an energy of approximately 18KeV, which interact with the carrier gas producing positive ions and secondary electrons with thermal energies. When a negative voltage is applied to the foil electrode, $\beta$ particles and secondary electrons are drawn to the anode where a current can be measured. When certain compounds are present in the carrier gas a decrease in standing current is observed. These compounds are able to capture electrons forming negative ions which are too bulky to be drawn to the anode by the interelectrode field, thus causing a decrease in current. The applied DC voltage may be either continuous or in pulses and in this embodiment the pulse rate is optimized to give maximum detector sensitivity to a specific vapour to be detected. The temperature also affects the performance of the detector, particularly in the adsorption of vapours within the detector. An electrical heating element 49 is wrapped around the detector housing 41 and covered with suitable insulation 50. The heating element is connected to the oven control circuit 51. The column, detector, oven assembly is inserted in a metal canister 52, and the various electrical connections and the exhaust line from the detector to the shut-off valve are fed through the tight-fitting lid 53 of the canister. The canister 52 is mounted in two insulating circular discs 54, 55 and inserted in a second canister 56, packed with a suitable insulating material 57. The second canister 56 also is fitted with a tight-fitting lid 58, which is bolted to the lid 53 of the inner canister by means of thermally insulating spacers 59. The electrical connections and exhaust line also pass through the lid 58.

In this embodiment, the major components of the apparatus are assembled integrally. Also forming a part of this integral assembly are electronic circuits for heating the adsorbant, controlling the oven temperature, cooling the collector assembly, pulsing the detector and measuring and amplifying the current flowing in the detector. This integral assembly is so designed and constructed as to fit conveniently into a small hand held probe. This design also enables components to be changed conveniently, and also for the simple adjustment of operating parameters.

The combination of adsorption by the adsorbant followed by partition and a detector response at a given predetermined time during the analyze cycle is sufficient to identify with a reasonable degree of confidence the presence of a specific vapour in the atmospheric sample.

The integral hand held unit is connected by appropriate gas lines and electrical wiring to a separate control unit which contains the carrier gas source 1 and regulation equipment, power supplies and circuitry enabling the automatic operation of the apparatus.

The control unit contains a carrier gas supply, in a standard B type cylinder providing sufficient gas for approximately 72 hours continuous usage plus a two stage regulator and fine metering valve to provide a constant gas flow through the detector. A medium capacity pump 28 (~15 cfh) for drawing atmospheric samples through the passge 7 filled with the adsorbant 18 is also mouned in the control unit. The remainder of the control unit contains power supplies 61 and circuitry 60 for controlling the various functions of the apparatus and to provide visual metering of the detector output plus visual and audible alarms for positive identification of a specific vapour.

The preferred embodiment of the vapour detector according to the present invention requires electronic and electrical measuring and control circuitry. Referring to FIG. 1, a Power Supply 61 is provided which supplies a range of direct current voltages for amplifiers, logic and timing circuits, lamps and relays. The Power Supply 61 also provides a high current switched 5 volt AC source for heating the collector and a switched, half wave rectified source for use by the collector heater control circuit. The Power Supply also provides a low voltage supply current of approximately 4 amps to the thermoelectric cooling module which cools the collector. FIG. 1 shows a rectangular block 60 which diagrammatically represents the safety and ready indicator circuits, the logic circuits and the timing circuits.

In order that the collector efficiently absorb the vapours to be detected, it is preferable to cool it below the ambient temperature of the unit. Cooling is effected via the thermoelectric module 31 shown in FIG. 4. The thermoelectric module 31 operates on the Seebeck and Peltier effect. A plurality of dissimilar metal junctions are arranged electrically in series. A current is passed through this device. The cooling junctions are arranged adjacent the collector hole 7 in the block 3 and the heating junctions are arranged adjacent the heat exchanger 32. The circuitry for the cooling module is generally indicated in FIG. 1 at In order that the vapours to be detected be released from the collector, the collector must be heated to a predetermined temperature. FIG. 1 shows the collector heating circuit at 34. Again, the collector heating circuit is controlled by the logic and timing circuits indicated at 60. The collector heating circuit is a switching regulator designed to control the temperature of the collector at a predetermined value. The circuit measures the resistance of the collector coil which is a function of its temperature. The circuit senses whether the resistance exceeds a predetermined value and using this measurement controls the application of heating power to the collector coil itself.

The column temperature of the preferred embodiment is preferably maintained at one of several possible predetermined values such as 80° or 160° C. for two possible applications. A heating coil 49 is wound around the column and detector assembly within the canister 52. Electrical energy is passed through the coil thereby heating the coil. A thermistor in the oven provides a signal to a bridge circuit for controlling the temperature of the column and detector. FIG. 1 shows the column and detector surrounded by an oven 41. The oven control circuit is indicated at 51.

The detector circuit requires for optimum operation that pulses of predetermined duration and amplitude and spacing, be applied to produce a standing current. The standing current will drop several orders of magnitude from the standing value in the presence of electron capturing materials. The measuring circuits of the present invention must respond to these changes. FIG. 1 shows the detector pulsing and measuring circuit at 49 connected to the detector 9. Again, the timing logic and indication of the detector pulsing and measuring circuit is controlled via the unit 60.

The timing circuits shown at 60 in FIG. 1 provide interval timing for control of the collector heater and for indication of the time at which specific materials to be detected should reach the detector. Control circuits sense the status of critical parameters and permit measurements to be initiated only if everything is in order. Several parameters of the system are monitored. The measurement signal is monitored to determine if it is within the correct standing current range. The gas pressure is monitored since column times are a function of flow rate which is partially determined by the gas pressure. The oven temperature is monitored since the oven temperature also effects column times. In addition, the control circuits determine whether the instrument is already in a timing cycle or registering an alarm. All of these factors must be in the correct state before the measurement can be initiated.

The operation of the apparatus will now be described in practical application. The carrier gas controls are all preset and it therefore only remains to turn the gas flow on at the main valve of the cylinder. The power switch is then turned on, which begins the collector cooling, the oven heating and the detector pulsing. When the system has stabilized, a ready light on the front panel is illuminated. During this warm-up period the collector assembly 2 is in the analyze position. Moving the collector lever 36 to the sample position, turns the pump 28 on and air is drawn through the adsorbant 18. The duration of the sampling procedure is controlled by the operator. Normally a 5 second sampling time is sufficient. The collector lever 36 is then moved to the analyze position which shuts off the pump. At the same time the adsorbant 18 is heated and the timing cycle commences while an analyze light is illuminated on the front panel and the ready light goes off. The heating circuit 24 is programmed to rapidly raise the temperature of the adsorbant 18 to a present level over a period of 1 to 2 seconds and maintain it at this level for a further 2 to 3 seconds before automatically shutting down. During this period any vapours adsorbed on the collector will be desorbed and transferred to the carrier gas, by which means they pass to the partition column. The combination of low adsorobant volume and rapid heating of the adsorbant 18 ensure that the vapours are introduced to the partition column 8 as rapidly and in as concentrated form as practicable. If none of the selected vapours are detected the ready light is illuminated and the analyze light goes off, indicating that a further sample may be taken.

If the selected vapour is detected, the alarm (visual or visual and audible) is activated and a new analyze cycle initiated wherein the adsorbant 18 is reheated and the timing cycle reinitiated. This automatic cycling continues until no trace of the specific vapour is detected, whereupon the analyze light goes off. At this stage the alarm is turned off manually, which illuminates the ready light, indicating that a new sample may be taken. Normally after a positive identification only one cycle ensures cleardown of the detector, however more than one cycle may be necessary if a large amount of the vapour has been collected. However many cycles are required, this procedure is automatically conducted by the apparatus.

The operations of the logic circuits and safety and ready indication circuit 60, will be described in relation to the operation of the apparatus. The collector assembly is in the analyze mode, when the instrument is turned off.

The carrier gas is turned on, followed by the power switch. The power switch activates the varius power supplies 61, and starts the oven control circuit 51, the detector pulsing and measuring circuit 48, the collector assembly cooling circuit 33, the heat exchanger blower and opens the electrically operated shut-off valve on the exhaust side of the detector. When the oven and detector have stabilized both thermally and electronically a ready light is illuminated by the logic circuits 60. The apparatus may now be used for sampling. The lever 36 is moved to transfer the collector assembly 2 to the sampling position, this movement activates a micro-switch which starts the suction pump 28. After sampling for several seconds the lever is used to return the collector to the analyze position. This shuts off the pump and the ready light and activates the analyze light, while activating the collector heating circuit and initiating the timing cycle. The audio and visual alarms operate at a preset time during the cycle and depend upon the separation of the detector current and the standing current over a 1 second interval at the preset time. Above a certain separation the alarms are activated, and timing continues for a further 4 seconds. At the end of this period the collector heating circuit is reactivated and a new timing cycle begins. The cycling process is continued until no further alarm is given, and the analyze light then goes out. If the alarm is turned off at this stage, the ready light will again be illuminated, and a new sample may be taken. If the alarms are not activated during the analyze cycle the ready light is automatically illuminated at the end of the cycle.

The apparatus of the present invention has an overall sensitivity which can be varied over a wide range, but which will permit the detection of as little as $10^{-12}$g of selected vapours. In addition to these properties, by simple component changes or adjustments in operating parameters, the apparatus may be used to detect a variety of trace vapours. A further feature of the present apparatus is the semi-automated mode of operation, eliminating the possibilities of misinterpretation of the performance of the apparatus.

Referring now to FIGS. 5a through 5f and 6, FIG. 5a illustrates a typical small response at the detector output. FIG. 5b represents the first derivative of the response shown in FIG. 5a. Note that the transient peak and the wanted peak in FIG. 5a have been transformed into S-shaped zero crossings in FIG. 5b. FIG. 5c illustrates the second derivative of the response shown in FIG. 5a. Again, the peaks appearing in 5a are transformed into zero crossing points in FIG. 5c. FIG. 5d illustrates another form of response which can appear at the output of the detector. In this particular response a long initial transient is superimposed on the wanted response. The long transient is due to a large quantity of an interfering substance. The waveform appearing in FIG. 5d is characteriized by an initial transient, a peak due to the interfering substance and a peak due to the wanted substance at the characteristic time. As can be seen from FIG. 5d it is rather difficult to determine those points of interest on the waveform. FIG. 5e is a waveform of the first derivative of the response shown in 5e. Since the peaks appear on a large slope due to the large interfering sample, only the initial transient produces a zero crossing response. However, the flat interfering peak and the wanted peak have been transformed into rather prominent peaks in FIG. 5e. FIG. 5f is the second derivative of the waveform shown in FIG. 5d. Here the transient peak, the interfering peak and the wanted peak have been transformed into definite zero crossing points. By observing the waveform shown in FIG. 5f it is much easier to determine the important output characteristics of the detector.

Figure 5:
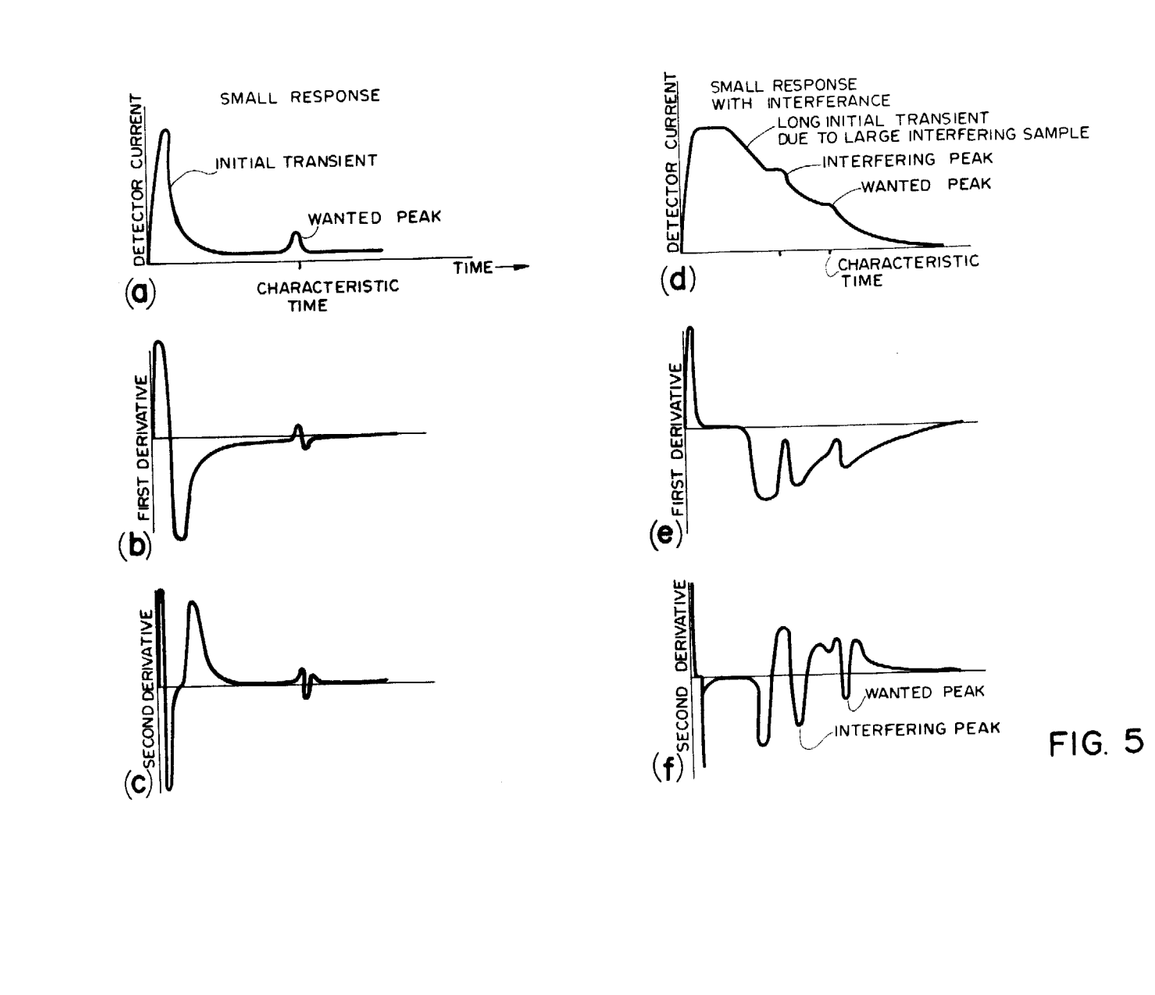
FIGS. 5a through 5f represent waveforms of possible signals appearing at specific places in FIG. 6.
Figure 6:
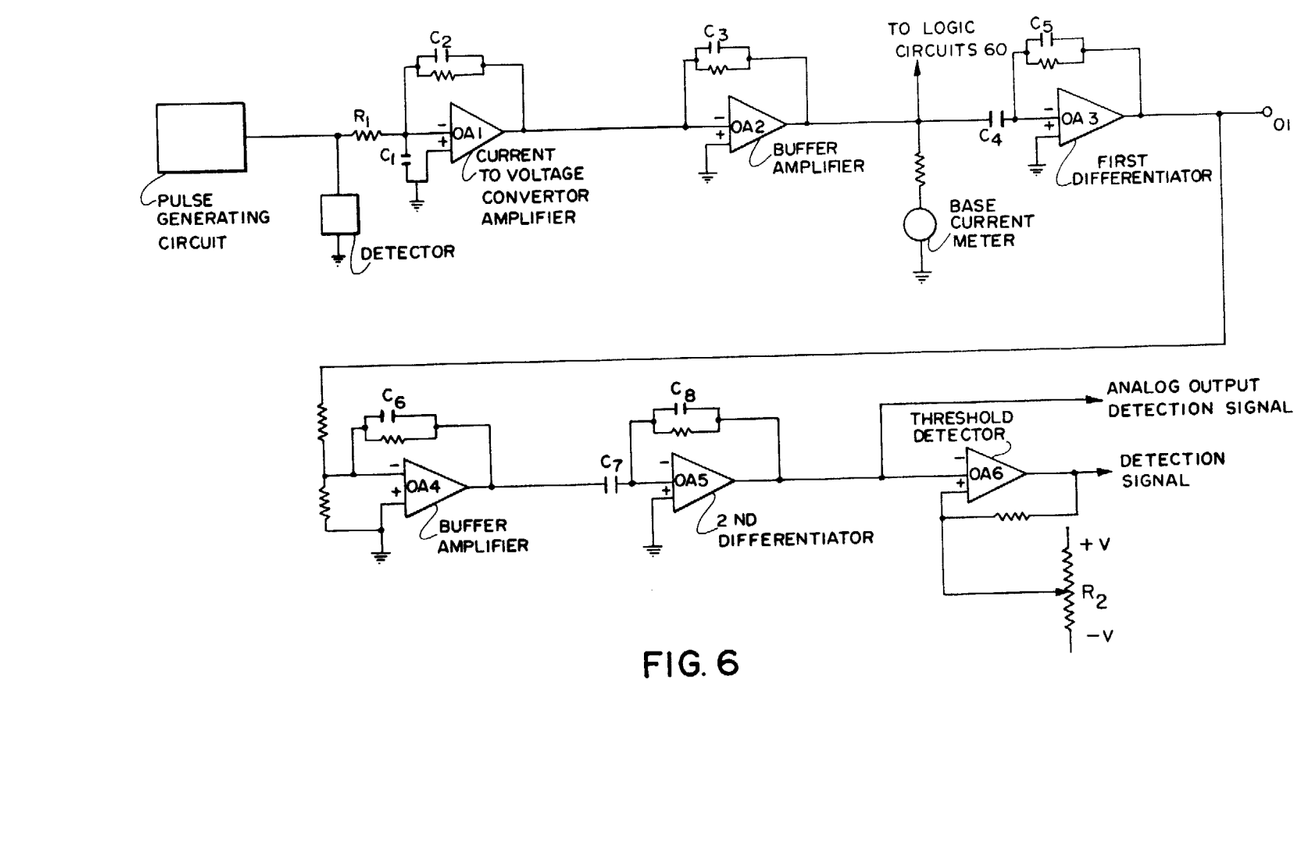
FIG. 6 is a schematic diagram of a particular processing circuit according to the present invention.

FIG. 6 illustrates the schematic diagram for producing the first and second derivatives of the output of the detector as illustrated in FIG. 5. The pulse generating circuit is that portion of the block 48 appearing in FIG. 1 which produces the direct current pulse for operating the detector. Operational amplifier 0A1 converts the changes in current flow in the detector into changes in output voltage. The output voltage is a linear function of the detector current. The output of the detector is smoothed out in a simple filter consisting of resistor R1 and capacitor C1. The output of operational amplifier 0A1 feeds a buffer amplifier 0A2. The buffer amplifier has a feedback circuit designed to operate the buffer amplifier at unity gain. The buffer amplifier is used, in conjunction with the other operational amplifiers in the circuit to control the frequency response of the overall processing circuit. In addition, of course, the buffer amplifier isolates the output of operational amplifier 0A1 from the first differentiator circuit which includes capacitor C4 and operational amplifier 0A3. Output terminal 01 thereby supplies the first derivative of the waveform produced by the detector. The output of the first differentiator circuit is fed to a second buffer amplifier 0A4. The buffer amplifier 0A4 operates identically with the buffer amplifier 0A2 previously described.

The buffer amplifier 0A4 feeds a second differentiator circuit consisting of capacitor C7 and operational amplifier 0A5. The output of operational amplifier 0A5 is an analog output signal corresponding to the second derivative of the output signal generated by the detector.

FIG. 6 also illustrates the use of a threshold detector comprising the operational amplifier 0A6. The output of the threshold detector 0A6 is a digital signal indicting the presence of a peak higher than the background noise level. This signal is used to trigger alarm circuitry if it occurs at the characteristic time for the material to be detected. The threshold level is adjusted by the potentiometer R7 which is fed at either end by a plus and minus supply voltage V.

The main problem in the design of differentiating amplifiers is that the gain of such amplifiers increases with frequency, hence, they are susceptible to high-frequency noise. To achieve the best possible signal to noise ratio the frequency roll-off of the frequency response of the processing circuit illustrated in FIG. 6 is accomplished as rapidly as possible at frequencies above the wanted signal frequency. This is accomplished by the addition of capacitors of appropriate value in the feedback loop of the operational amplifiers. In operational amplifier 0A1 and 0A2, capacitors C2 and C3 add high frequency dependent feedback which progressively reduces the gain of the amplifiers as the frequency increases. The frequency at which the roll-off begins is carefully chosen for maximum attenuation of high frequencies with little or no attenuation of the signal. Capacitors C5, C6 and C8 perform similar functions.

Note that the output of buffer amplifier 0A2 feeds a base current meter as well as logic circuits which are contained in box 60 illustrated in FIG. 1.

What we claim as our invention is:

1. An apparatus for detecting a trace of a specific vapour in an atmospheric sample, comprising
   a. a collector assembly having an inlet and an outlet and a passage extending from the inlet to the outlet, the passage being filled with a solid adsorbant which is capable of adsorbing the specific vapour together with other vapours in the atmospheric sample and which is capable of being readily heated to desorb the adsorbed vapours,
   b. heating means for heating the adsorbant to desorb the adsorbed vapours,
   c. a partition column connectable to the outlet of the passage for separating the desorbed vapours,
   d. a detector connected to the partition column for detecting the specific vapour among the separated vapours,
   e. a carrier gas source connectable to the inlet of the passage to provide a flow of a carrier gas so that the carrier gas passes the desorbed vapours to the partition column for separation and the separated vapours to the detector for detection of the specific vapour,
   f. said collector assembly being movable between a sampling position where the passage is communicated with the atmosphere while disconnected to the partition column and the carrier gas source, and an analyzing position where the passage is connected to the partition column and the carrier gas source while disconnected to the atmosphere, and
   g. means to draw the atmospheric sample over the adsorbant when the collector assembly is in the sampling position.

2. An apparatus as claimed in claim 1 wherein means are provided for controlling the temperature of the partition column and the detector.

3. An apparatus as claimed in claim 1 wherein the means to draw the atmospheric sample includes a pump for drawing the sample through the passage filled with the adsorbant and a control circuit for automatically shutting off the pump when the collector assembly is moved from the sampling position to the analyzing position.

4. An apparatus as claimed in claim 1 wherein the heating means includes a collector heating circuit designed to be automatically turned on when the collector assembly is moved from the sampling position to the analyzing position and programmed to rapidly raise the temperature of the adsorbant to a predetermined level, and maintain it at that level for a predetermined short period of time before automatically shutting down.

5. An apparatus as claimed in claim 1 wherein the adsorbant is gold wire or nickel wire.

6. An apparatus as claimed in claim 1 wherein the carrier gas is helium, argon or argon containing about 5% by volume of methane.

7. An apparatus as claimed in claim 1 which includes means for cooling the adsorbant to a temperature below that of the atmospheric sample.

8. An apparatus as claimed in claim 1 wherein said collector assembly has an additional passage arranged to communicate with the carrier gas source and the partition column for flow of the carrier gas therethrough when the assembly is in the sampling position and to be disconnected from them when the assembly is in the analyzing position.

9. An apparatus as claimed in claim 8, wherein the heating means is electrically controlled to be automatically turned on and off to heat the adsorbant at a predetermined temperature for a predetermined short period of time.

10. An apparatus as claimed in claim 9 wherein the heating means includes a collector heating circuit adapted to be turned on when the collector assembly is moved from the sampling position to the analyzing position.

11. An apparatus as claimed in claim 10 wherein the collector heating circuit is associated also with the detector so that it be turned on when the detector detects the specific vapour.

12. An apparatus as claimed in claim 11 wherein the detector comprises a chamber having an inlet and an outlet for flow of the separated vapours therethrough from the inlet to the outlet, means to provide free electrons in the chamber, a cathode and an anode in the chamber and means to monitor the current flowing between the electrodes, the monitoring means including timing circuits providing internal timing for indication of the time at which the specific vapor is expected to pass through the chamber and for control of the collector heating and cooling circuit.

13. An apparatus as claimed in claim 12 wherein the partition column and the detector chamber are enclosed by an oven electrically controlled to maintain the column and the chamber at a predetermined temperature.

14. An apparatus as claimed in claim 1 wherein the detector comprises a chamber having an inlet and an outlet for flow of the separated vapours therethrough, means to provide free electrons in the chamber, and a cathode and an anode in the chamber for connection to means to apply a DC voltage to the electrodes and to monitor the current flowing between the electrodes.

15. An apparatus as claimed in claim 3 wherein the means to provide free electron is titanium tritide or Ni63 coated on the cathode.

16. An apparatus as claimed in claim 14 wherin the means to monitor the current includes timing circuits providing interval timing for indication of the time at which the specific vapour is expected to reach the chamber.

17. An apparatus according to claim 3 wherein said means to monitor the current flow between the electrodes includes a current to voltage converter amplifier having an input connected to said detector; a buffer amplifier having an input connected to said converter amplifier and a first differentiator circuit connected to said buffer amplifier to thereby produce an output signal corresponding to the first derivative of the current flow between the electrodes.

18. An apparatus according to claim 17 wherein said input to said converter amplifier is connected to said detector via an RC low pass filter.

19. An apparatus according to claim 18 wherein said converter amplifier and said buffer amplifier are operational amplifiers.

20. An apparatus according to claim 19 wherein said first differentiator circuit is comprised of the series connection of a capacitor and an operational amplifier.

21. An apparatus according to claim 20 wherein said means to monitor further includes a second buffer and a second differentiator circuit respectively connected in series with said first differentiator circuit to thereby produce an output signal corresponding to the second derivative of the current flow between electrodes.

22. An apparatus according to claim 21 wherein said differentiator circuit consists of a series connected capacitor and an operational amplifier.

23. An apparatus according to claim 22 wherein said second buffer amplifier is an operational amplifier.

24. An apparatus according to claim 23, wherein said means to monitor further includes a threshold detector comprising an operational amplifier, said operational amplifier having a first input connected to said second differentiator and a second input connected to a reference voltage, said threshold detector having an output which is a digital signal indicative of the presence of a voltage level at the output of said second differentiator which is higher than said reference level.

25. An apparatus according to claim 24, wherein at least one capacitor is connected in parallel with said converter amplifier, said buffer amplifier, said first differentiator, said second buffer amplifier and said second differentiator so as to limit the high frequency response of said means for monitoring.

* * * * *